United States Patent
Pringiers (10) Patent No.: US 8,356,646 B2
(45) Date of Patent: Jan. 22, 2013

(54) NON-MARKING ANTISTATIC TIRE

(75) Inventor: Koenraad Pringiers, Colombo (LK)

(73) Assignee: Artic Investments S.A., Luxembourg (LU)

( * ) Notice: Subject to any disclaimer, the term of this patent is extended or adjusted under 35 U.S.C. 154(b) by 964 days.

(21) Appl. No.: 12/205,060

(22) Filed: Sep. 5, 2008

(65) Prior Publication Data

US 2009/0065114 A1 Mar. 12, 2009

(30) Foreign Application Priority Data

Sep. 11, 2007 (EP) ..................................... 07116165

(51) Int. Cl.
- *B60C 19/08* (2006.01)
- *B60C 7/00* (2006.01)
- *B29D 30/02* (2006.01)

(52) U.S. Cl. ...................... 152/152.1; 152/246; 152/302; 156/112

(58) Field of Classification Search .................. 156/112, 156/123, 125, 127, 128.1, 128.6, 129; 152/152.1, 152/209.5, 302, 246

See application file for complete search history.

(56) References Cited

U.S. PATENT DOCUMENTS

| 1,797,545 | A | 3/1931 | Churcher |
| 6,367,525 | B1 | 4/2002 | Hiruma et al. |

FOREIGN PATENT DOCUMENTS

| DE | 1993828 | | 6/1968 |
| DE | 10154454 | C1 | 6/2003 |
| EP | 787604 | A2 | 12/1899 |
| EP | 787604 | A2 * | 1/1997 |
| EP | 1792720 | A2 | 6/2007 |

* cited by examiner

*Primary Examiner* — Katarzyna Wyrozebski Lee
*Assistant Examiner* — Scott W Dodds
(74) *Attorney, Agent, or Firm* — Jacobson Holman, PLLC (57) ABSTRACT

A solid tire for a wheel comprising electrically conducting means (15) made according to the method of any one of claims 1-16 comprising a cured first cylindrical layer (1) comprising a first outer circumferential surface (10) provided for contacting the ground, the first layer (1) having an electrical resistance being larger than $10^{10}$ $\Omega$cm, the tire (5) comprising an electrically conducting path (6) in electrical connection with the electrical conducting means (15) and extending through the first layer (1), the electrical conducting path (6) comprising a path-filling material (16) having a lower electrical resistance than the electrical resistance of the first layer (1), characterized in that the first layer (1) comprises less than 2 pphr carbon black, in that the first layer (1) comprises more than 30 pphr reinforcing filling material and in that the electrically conducting path (6) has a ground contacting surface (19) having an area of at least 150 mm².

17 Claims, 7 Drawing Sheets

NON-MARKING ANTISTATIC TIRE

The present invention relates to a method for producing a solid tire according to the preamble of the first claim.

It is known from the state of the art to produce the tread surface of a solid tire which contacts the floor over which the tire is moving, with curable or cured non-marking material to avoid the presence of unwanted tire marks on the floor surface. Tires made of rubber containing carbon black, usually leave black markings when moving over the floor. Such markings are especially undesired in situations where high demands on hygiene are imposed, for example areas where food is being processed. It is also known from the state of the art that the marking of the floor can be avoided by replacing part of the traditional mixtures for the tread surface which contain carbon black with, for example, silica based mixtures to obtain a non-marking material.

A tire having a tread surface made of such a non-marking mixture however presents the disadvantage that the electrical conductivity of the non-marking tread surface is low. Whereas with a tire having a tread surface comprising a carbon black mixture, electrical charges built up to the vehicle could be sufficiently conducted towards the ground, tires of which the tread surface is made of a non-marking mixture can only conduct the electrical charge towards the ground at a higher potential difference between the ground and the vehicle. As a consequence, tires having a tread surface made of a non-marking mixture often show spark discharges, which can be dangerous and are often unwanted, especially in environments containing explosive or inflammable materials.

DE10154454 discloses an attempt to solve this problem and discloses a solid tire comprising an inner rim which extends in circumferential direction of the tire. To the outer circumferential face of the rim, a layer of a second material is applied. The outer circumferential face of this layer of the second material is covered with a layer of a first material. The circumferential outer face of the layer of the first material forms the tread surface and is provided to contact the ground. The second material is made of a mixture of rubber and carbon black whereas the first material is made of a white rubber silica non-marking mixture. The electrical resistance of the second material is smaller than the electrical resistance of the first material, the latter being larger than $10^{10}$ Ωcm. The second layer protrudes through the first layer up to the tread surface, and conducts electrical charges from the second layer to the ground. The protrusions are produced during curing or vulcanisation of the uncured tire in a vulcanisation mould. The vulcanisation mould thereto comprises an opening at the position where a protrusion is desired, the shape of the opening corresponding with the desired shape of the cross-section of the protrusion. Vulcanising the tire causes the unvulcanised rubber to expand until it contacts the inner surface of the mould. At the position of the opening, the white rubber silica is pushed out off the mould by the expansion of the rubber of the second layer, causing the formation of a funnel-shaped protrusion of the second layer through the first layer up to the tread surface.

The expansion of the rubber through the opening in the mould is however difficult to control. As a consequence, the shape and dimensions of the funnel-shaped protrusion are difficult to control. To allow a certain control of the expansion through the opening of the mould, the opening of the mould is restricted to 20-50 mm². An analysis of the problems arising with such tires is that the surface area of the protrusion where it contacts the ground is relatively small. This limits the amount of electrical charge that can be discharged through the protrusion. To permit sufficient discharge, a plurality of protrusions is provided along the circumference of the tread surface. However, with an increasing number of protrusions the quality of the tire decreases. Also there is a substantial risk that undesired effects occur during the expansion of the rubber through the opening disturbing the layered structure of the tire. This may cause local variations of the mechanical characteristics of the tread surface, infer an electrical conductivity which is less than desired and produce a tire of inferior quality having varying wearing properties upon use. When using the tire, the tread surface including the surface of the protrusions contacting the ground wears away. Since the protrusions, due to their production method, are inherently funnel-shaped, this causes the diameter of the protrusion to increase, increasing the risk for the tire to mark the floor accordingly.

EP787604 discloses a tire having a circumferential tread surface with an electrical resistance of above $10^{10}$ Ωcm. Electrical conductive properties for discharging electrical charges are provided by the presence of paths which extend radially through the material of the tire up to the tread surface of the tire. The paths are filled with a polymer plug made of rubber and/or plastic having an electrical resistance which is smaller than $10^8$ Ωcm. The paths are produced using a drilling tool and drilling a path which extends through the first and the second layer. Thereafter, a polymer plug is injected under pressure into the paths using an injection device. The process for providing a tire with electrically conducting paths disclosed by EP787604 discloses that the method may be applied to uncured solid tires, which are cured after injection of the electrically conductive plug.

However, due to the injection process used, the diameter of the plugs is limited to 1-10 mm. The limited diameter limits the contact area of the plugs with the ground and therefore increases the resistance of the polymer plugs. In order to provide the tire according to EP787604 with sufficient electric discharge capabilities without unduly increasing the number of polymer plugs, the amount of carbon black contained in the material of the tread surface is increased so that part of the electric charge can be discharged through the tread surface. The tread surface of the tire disclosed by EP787604 therefore still comprises a higher concentration of carbon black than non-marking tread surfaces. Therefore, EP787604 does not relate to tires having a non-marking tread surface.

There is thus a need for a method for producing solid tires with a non-marking tread surface which are provided with paths which show an improved ability of discharging electric charge from the vehicle and have a better controllable ground contacting surface area.

Accordingly, it is the object of the present invention to provide a method for producing a solid tire with a non-marking tread surface comprising paths filled with conductive curable material with an improved ability of discharging electric charge and a more controllable ground contacting surface area.

This is achieved according to the present invention with a method showing the technical features of the characterising portion of the first claim.

Thereto, the method of this invention is characterised in that the filling of the path with the uncured curable material takes place under atmospheric pressure, in that the first layer comprises less than 2 pphr (parts per hundred) of carbon black, at least 30 pphr of reinforcing filling material and in that the path-filling material after curing has a ground contacting surface area of at least 150 mm².

The inventor has found that by filling the path with uncured curable material under atmospheric pressure, a tire may be provided with plugs having larger ground contacting surface areas, in particular a surface area of at least 150 mm² can be achieved. The inventors have surprisingly and successfully observed that a single plug suffices to achieve a sufficient discharge of undesired electric charges through the filled path, whereas the amount of carbon black in the tread surface may be kept at a minimum level to minimise the risk to the occurrence of marking. The inventor has moreover found that when the first layer comprises less than 2 pphr (parts per hundred) of carbon black and the first layer comprises more than 30 pphr of reinforcing filling material, the risk that the first layer leaves marks on the ground is substantially reduced. The inventor has moreover found that the risk for marks caused by the ground contacting surface of the reinforcing filling material is not significantly increased by increasing the ground contacting surface.

Further preferred embodiments are disclosed in the dependent claims.

The present invention also relates to a tire which contains the above described plug.

Other details and advantages of the method of to the invention will become apparent from the enclosed figures and description of preferred embodiments of the invention.

According to this invention, an uncured tire 5 is made which comprises a first cylindrical layer 1 which functions as the tread surface and is provided to contact the ground. The first layer 1 extends in circumferential direction around the axis of the tire and is made of an uncured curable first material containing a reinforcing filling material. The first material comprises less than 2 pphr carbon black and at least 30 pphr reinforcing filling material. After having applied the uncured curable first material for the first layer 1, part of the first material is removed to create a path 6 which extends from at least a first inner circumferential surface 11 of the first layer through the first layer 1 up to an opening 9 in a first outer circumferential surface 10 of the first layer 1, opposite the inner circumferential surface 11 of the first layer. The path 6 then is filled with an uncured curable path-filling material 16 which has an electrical resistance of less than 10 Ωcm. Finally the tire 5 and the path-filling material are cured. After curing, the path-filling material 16 extends from the first outer circumferential surface 10 which is provided to contact the ground and forms the tread surface, up to the cured first inner circumferential surface 11. This way the ground contacting surface 19 of the path-filling material 16 is electrically connectable to the electrically conducting means 15 of the wheel 4.

The use of carbon black as a reinforcing filling material for elastomers is well known in the art. However, since carbon black leaves undesired black marks on the floor, its concentration is limited to below 2 pphr and a non-marking reinforcing filling material is used beside the carbon black. As non-marking reinforcing filling material white reinforcing filling materials are used, preferably silica. The exact composition of the non-marking reinforcing filling material can be determined by the person skilled in the art.

The use of non-marking reinforcing filling materials and the reduced concentration of conductive carbon black in the tire 5 however increases the electrical resistance. The electrical resistance of the material of the first layer 1 is larger than $10^{10}$ Ωcm. The first material preferably comprises less than 0.5 pphr of carbon black, more preferably less than 0.2 pphr carbon black. The inventor has found that by decreasing the amount of carbon black, the risk that marks are left on the ground by the cured tire 5 is decreased significantly. The first material preferably contains between 30 and 60 pphr of reinforcing filling material, more preferably about 50 pphr.

Although the exact composition of the material of the first layer 1 is not critical for the invention, the composition of the material of the first layer 1 preferably is chosen in function of the mechanical properties to be achieved after curing since the first layer 1 will contact the ground. More preferably, the mechanical properties of the material of the first layer 1 are adapted to the ground on which the tire 5 will be used.

Removing part of the material of the first layer 1 in order to create the path 6 can be done in any way known to the person skilled in the art. The path 6 can for example be cut away, molten away, burned away, pushed away, etc.

The path 6 preferably extends in radial direction of the tire 5, more preferably linearly from the first inner circumferential surface 11 towards the first outer circumferential surface 10. Thereto, part of the first layer 1 is removed in the form of a straight, preferably radially extending path, which extends from the first inner circumferential surface 11 up to the first outer circumferential surface 10. A radially extending linear path 6 appears to provide optimum discharge of undesired electrical charges. Most preferably, the path 6 is cylindrical with a circular ground contacting surface 19. However the path 6 may take any other form and the path 6 can for example be beam-shaped with a square ground contacting surface. The inventor however has found that a cylindrical shaped path 6 facilitates filling the path with path-filling material 16 and offers a homogeneous wear of the tread surface of the tire 5.

The ground contacting surface 19 of the path 6 has a surface area of at least 150 mm². The presence of a large ground contacting surface area increases the possibility of discharging unwanted electrical charges from the vehicle towards the ground. To limit the risk that marks are left on the floor by the path-filling material 19, the ground contacting surface 19 has a surface area preferably smaller than 500 mm².

The filing of the path 6 with uncured path-filling material 16 preferably takes place under atmospheric pressure. The path-filling material 16 can for example be manually inserted into the path 6. The manual application is however not critical for the invention and the path-filling material 16 can for example also be mechanically inserted. The path-filling material 16 can be any curable material deemed appropriate by the person skilled in the art but preferably is chosen in function of the composition of the material of the first layer 1 and the desired mechanical characteristics. More preferably, the path-filling material comprises carbon black since carbon black renders the path-filling material sufficiently conductive to discharge unwanted electric charges to the ground and offers the cured path-filling material with good mechanical properties. The path-filling material 16 preferably is provided in the form of a solid body, more preferably a plastic deformable solid body, which is inserted into the path 6. The form of the path-filling material is however not critical for the invention and can for example be in the form of a paste which is used to fill the path 6, a liquid which is poured into the path 6, etc. Preferably, the plastic deformable solid body is cylindrically shaped. Any other form such as for example a beam shaped solid body can however be used. The dimensions of the solid body are preferably adapted to the dimensions of the path 6. Preferably, the dimensions of the solid body are such that the path-filling material 16 contacts the walls delimiting the path 6 so that the path-filling material 16 adheres to the walls of the path 6. Preferably, the dimensions of the path-filling material 16 and/or the composition of the path-filling material 16 are chosen so that during curing of the tire 5 at least part of the path-filling material 16 flows into at least part of the material of the walls delimiting the path 6 and vice-versa, permanently connecting the path-filling material 16 to the material of the first layer 1.

The first layer 1 may contain one single path 6 or a plurality of such paths 6 filled with path-filling material 16, if it is desired to increase the ability of the tire 5 to discharge unwanted electrical charges to the ground. The first layer may for example be provided with one, two, three, four, five, six, seven, eight or more paths 6. Although their mutual position is not critical for the invention, the position of the respective ground contacting surfaces 19 is preferably symmetric with respect to each other and to the tread surface of the tire 5 to allow unwanted electrical charges to be discharged at regular intervals and to increase the homogeneity of the tire 5. This way homogeneous wearing of the tread surface may be achieved, and the homogeneity of the mechanical properties of the tire 5 is improved.

In order to improve discharge of unwanted electric charges to the ground without significantly increasing the risk that unwanted tire marks are left on the floor, the total surface area of the ground contacting surfaces 19 of paths 6 preferably is less than 1% of the total area of the tread surface. More preferably, the total area of the ground contacting surfaces 19 is less than 0.1% of the total area of the tread surface of the tire 5.

During curing preferably a tread pattern is provided to the tire 5 comprising ribs delimited by grooves. The opening 9 of the path 6 preferably is provided on a rib of the tread pattern so that the ground contacting surface 19 of the path 6 can more easily contact the ground.

The resulting tire 5 is then mounted to a rim 8 to form the wheel 4 in such a way that the path filling material 16 contacts the electrical conductive means of the wheel, for example the wheel rim 8. Any method known to the person skilled in the art can be used to mount the first layer 1 to the rim 8 of the wheel such as for example clamping the first layer 1 between different parts of the rim 8.

The electrical conductive means 15 comprise any electrically conducting means which can be mounted to a vehicle, such as a rim 8 of a wheel parts of the engine, the frame, etc.

The path-filling material 16 preferably is electrically connected to the electrical conductive means 15 after mounting the tire 5 to the wheel 4 of the vehicle. More preferably, the path-filling material 16 is electrically connected to the rim 8 of the wheel after mounting the tire 5 to the rim 8. The path-filling material 16 can contact the rim 8 directly or can be electrically connected to the rim 8 by intermediate parts conducting the unwanted electrical charges to the ground such as for example parts of the tire 5. Examples of such a configuration will be given later on.

Although the presence of the first layer 1 only will be sufficient for some applications, the tire 5 may comprise more than one layer. Thereby the material used for building the first and second layer may be the same or different. The tire of the present invention in that case is produced by providing a second cylindrical layer 2 which extends in circumferential direction of the tire 5, and thereafter providing on top of this second layer 2 the first layer 1 forming the tread surface. The second layer 2 comprises a second outer circumferential surface 12, the inner circumferential surface 11 of the first layer 1 runs along the second outer circumferential surface 12 and the path-filling material 16 extends at least up to the second outer surface 12. The second layer 2 can comprise any second material known to the person skilled in the art. A tire 5 comprising two layers 1, 2 is for example shown in FIGS. 5, 6 and 7 and in FIGS. 1-4, as will be explained later on.

The path 6 may fully extend through the first layer 1 and the second layer 2 and may directly contact the electrically conducting means 15. However it may be sufficient for the path 6 to extend up to the second outer circumferential surface 12, if the material of the second layer 2 has an electrical resistance which allows unwanted electric charges to be conducted from the electrically conducting means 15 towards the path-filling material 16 along the material of the second layer 2. In such an embodiment, the electrical resistance of the material of the second layer 2 preferably is smaller than the electrical resistance of the material of the first layer 1. Such an embodiment is for example shown in FIG. 5.

Figure 7:
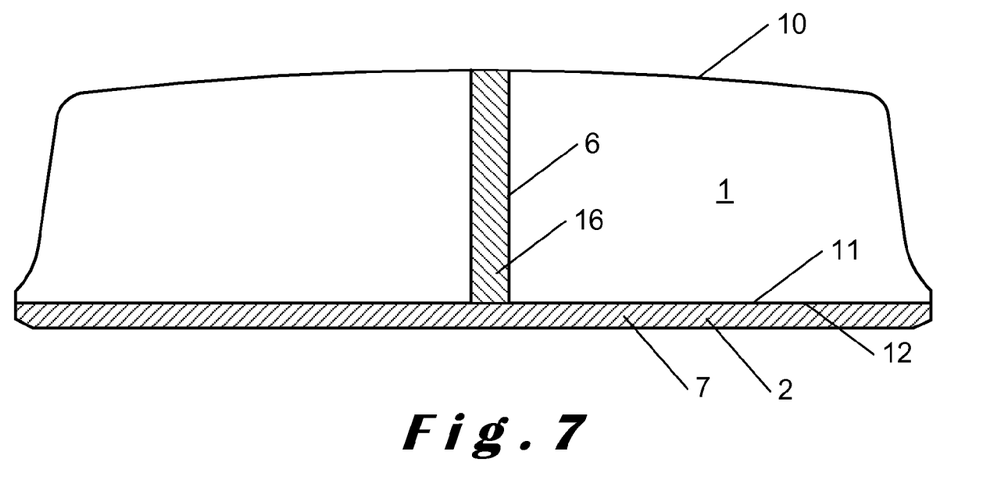
FIG. 7 shows a cross section of another embodiment of a tire according to the invention The present invention relates to a method for producing a solid tire 5 for a wheel 4 for a vehicle comprising electrical conducting means 15. The wheel 4 is suitable for use with any vehicle known to the person skilled in the art.

In a first preferred embodiment, the material of the second layer 2 comprises a cylindrical metal plate which extends in circumferential direction of the tire and is mounted to the cured tire 5 which, when mounted to the wheel 4 of the vehicle contacts the electrically conducting means 15 of the vehicle, such as for example the rim 8. This first embodiment is shown in FIG. 7. In another preferred embodiment of the tire 5 according to the invention, the material of the second layer 2 comprises a curable material which is uncured when applied to the uncured tire 5. The material of the second layer preferably comprises relatively soft rubber with good dynamic and resilient properties. The material of the second layer 2 can for example comprise carbon black since it does not contact the ground and can therefore leave no marks on the floor. The use of carbon black moreover combines good conductive properties with good dynamic and resilient properties.

Figure 6:
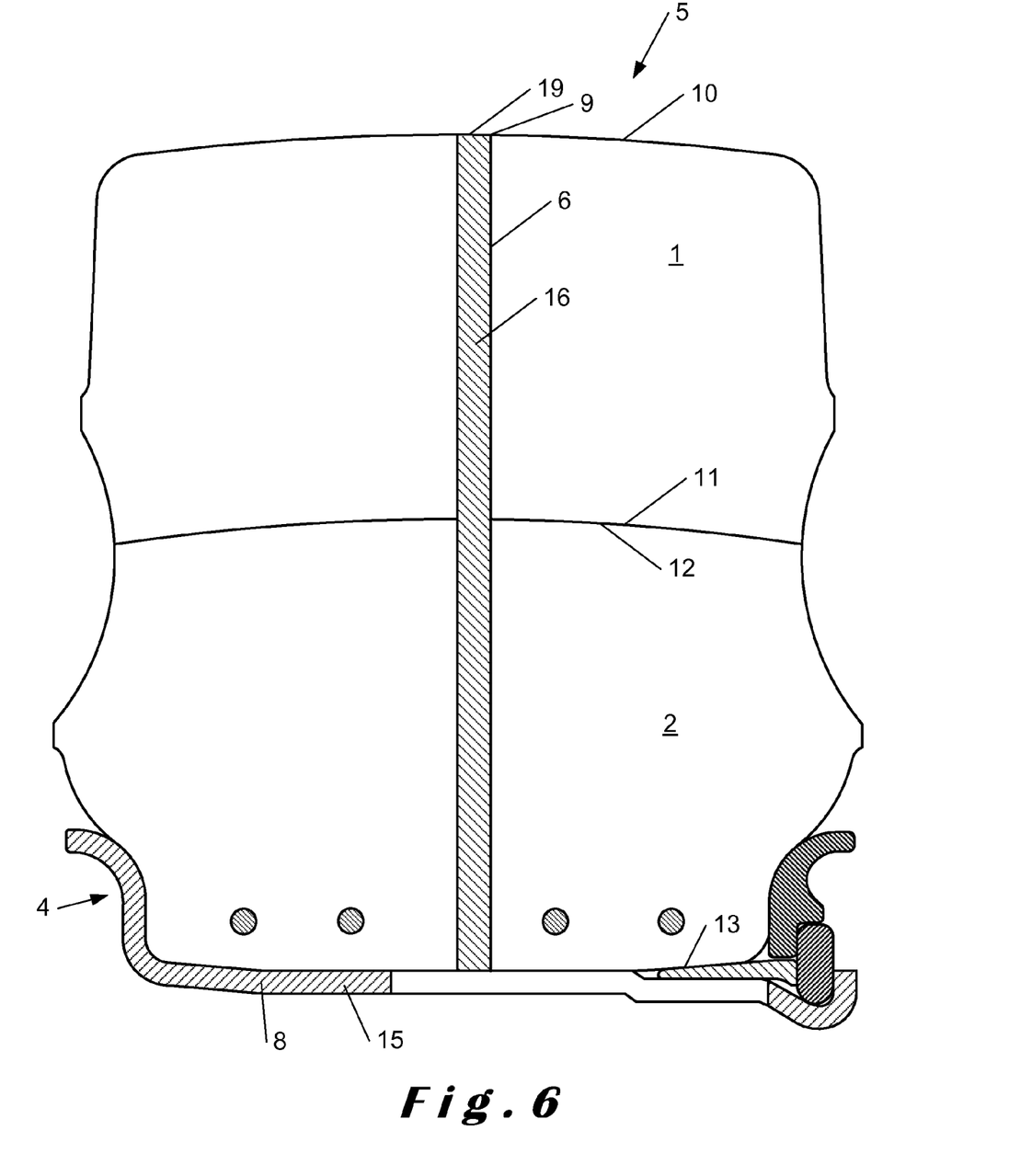
FIG. 6 shows a cross section of another embodiment of the tire according to FIG. 5.

The conductivity of the material of the second layer 2 is however not critical for the invention. When the second material of the second layer 2 is not sufficiently conductive for discharging unwanted electric charges to the ground or when an increased discharge of such charges is desired, the path 6 is extended through the second layer 2 and preferably extends up to a second inner circumferential surface 13 with the path-filling material 16 preferably extending up to the second inner circumferential surface 13 so that the path-filling material contacts the electrically conducting means 15, such as for example the rim 8, when the tire 5 is mounted to the rim 8, as shown in FIG. 6.

Figure 5:
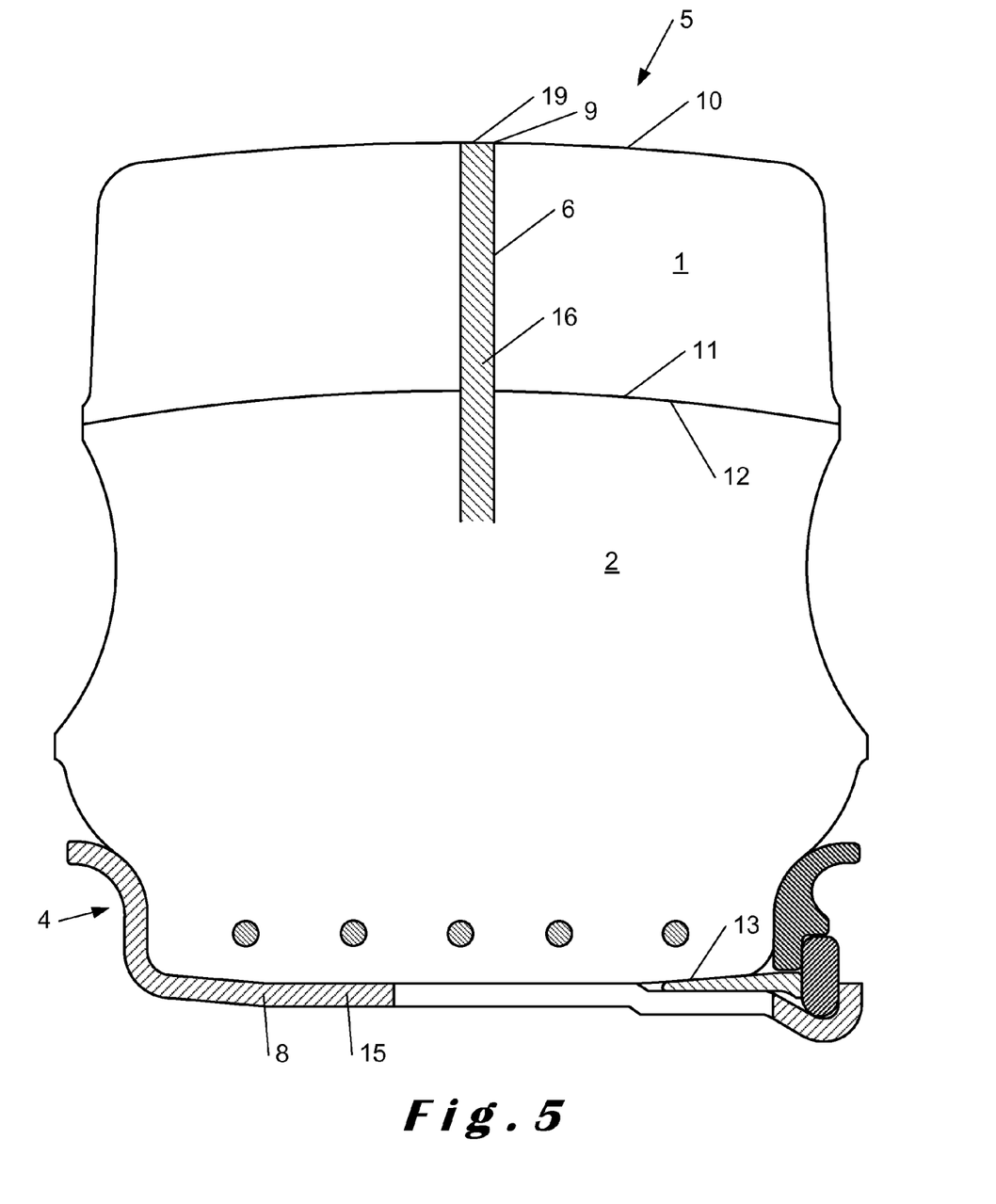
FIG. 5 shows a cross section of another embodiment of a tire according to the invention having two layers.

The second layer 2 can be mounted to the rim 8, for example metal plate can be mounted to the rim 8 by any means known to the person skilled in the art. FIGS. 5 and 6 for example show that the second layer 2 can be clamped into a rim 8.

Similarly a third layer 3 can be applied beneath the second layer 2 in circumferential direction of the tire 5, the third layer 3 comprising a third material and a third outer circumferential surface 14 running along the second inner circumferential surface 13.

Figure 1:
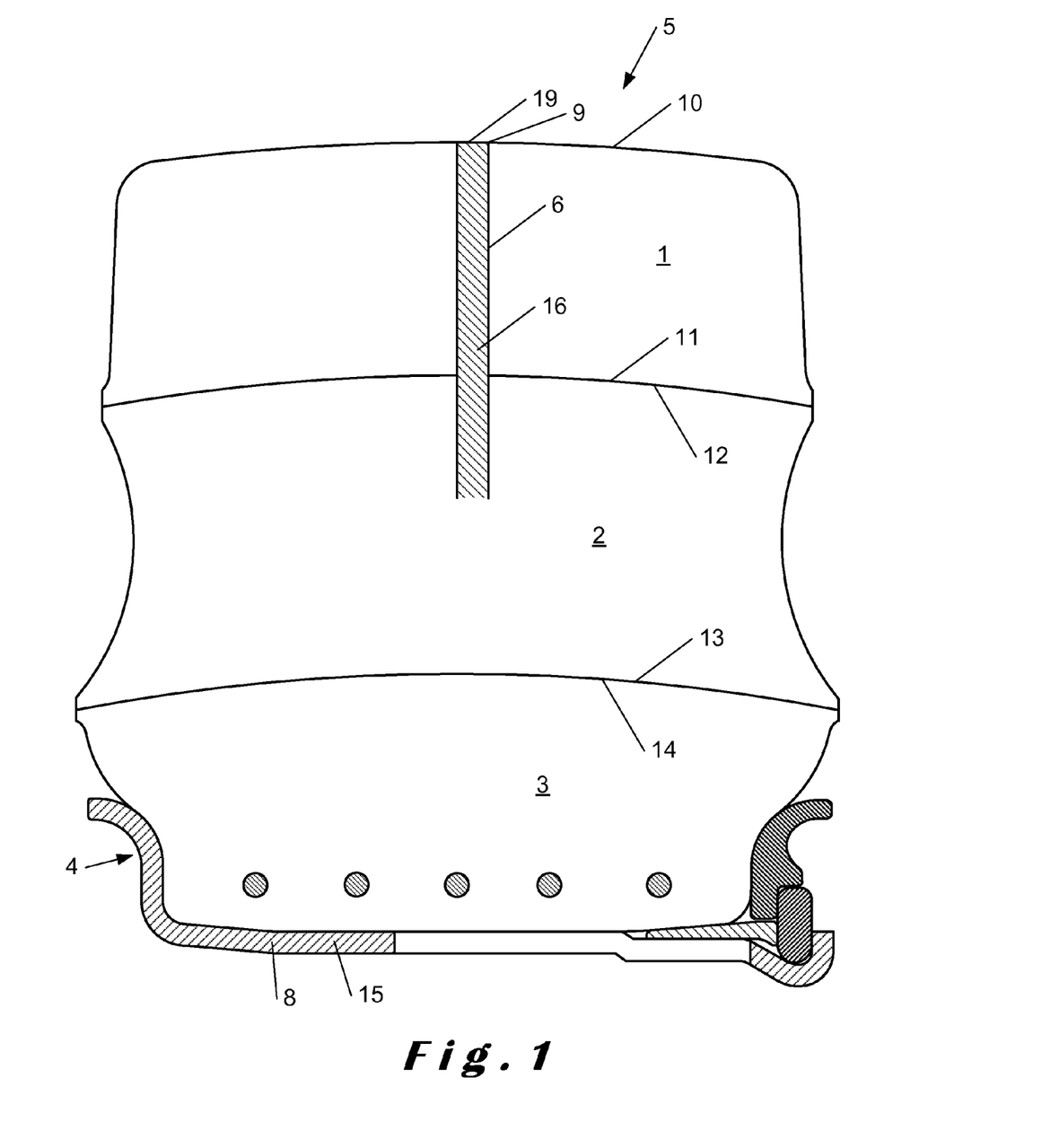
FIG. 1 shows a cross section of a tire according to the invention having tree layers mounted to a rim.
Figure 2:
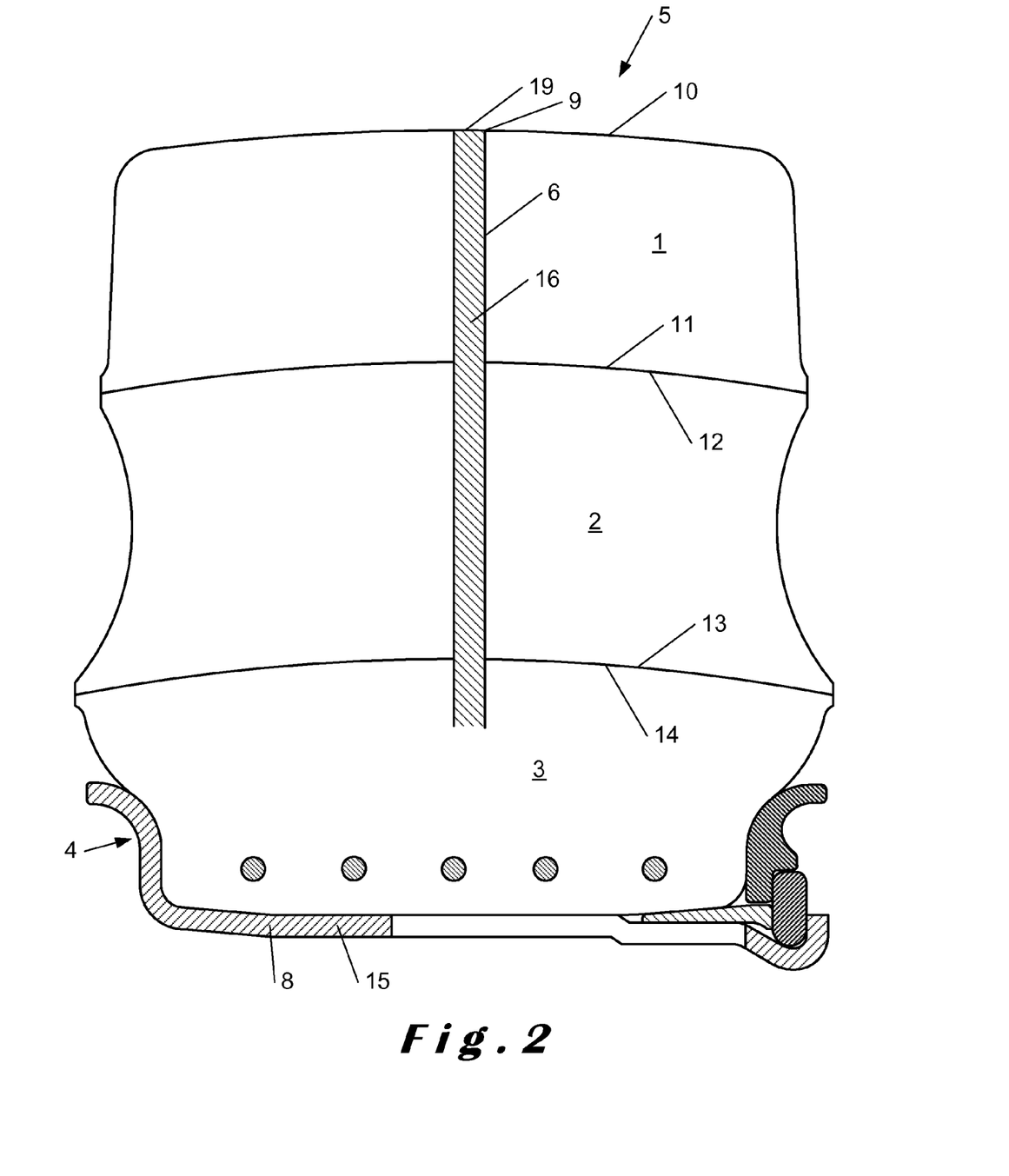
FIG. 2 shows a cross section of a different embodiment of the tire according to FIG. 1.

Although the path 6 can fully extend through the third layer 3 to contact the electrically conducting means 15, it is sufficient for the path 6 to extend up to the third outer circumferential surface 14 if the material of the third layer 3 is sufficiently electrically conductive to conduct unwanted electric charges from the electrically conducting means 15 towards the ground and is in electrical connection with the electrically conducting means 15 of the wheel 4. More preferably, the material of the third layer comprises a curable material which is uncured when applied to the uncured tire 5. The material of the third layer 3 preferably comprises a hard rubber to ensure a firm mounting to the wheel 4, more preferably the rim 8, as shown in FIGS. 1-4. Since the material of the third layer 3 does not contact the ground, carbon black may be used as a reinforcing filling material, preferably providing the third layer 3 with a sufficient electrical conductivity to permit conducting unwanted electrical charges to the ground along material of the second layer 2 and/or the path-filling material 16. A sufficiently electrically conductive third layer 3 in electrical connection with a sufficiently electrically conductive second layer 2 is for example shown in FIG. 1. The unwanted electrical charges are conducted from the electrical conductive means 15, the rim 8, to the material of the third layer 3, the material of the second layer 2 and up to the ground along the path 6 through the path-filling material 16. A sufficiently electrically conductive third layer 3 in combination with an electrically insufficiently conductive second layer 2 is shown in FIG. 2. The path 6 pierces through the second layer 2 at least up to the third layer 3. Any unwanted electric charge is conducted from the electrical conductive means 15 towards the third layer 3 and along the path-filling material 16 of the path 6 to the ground.

Figure 3:
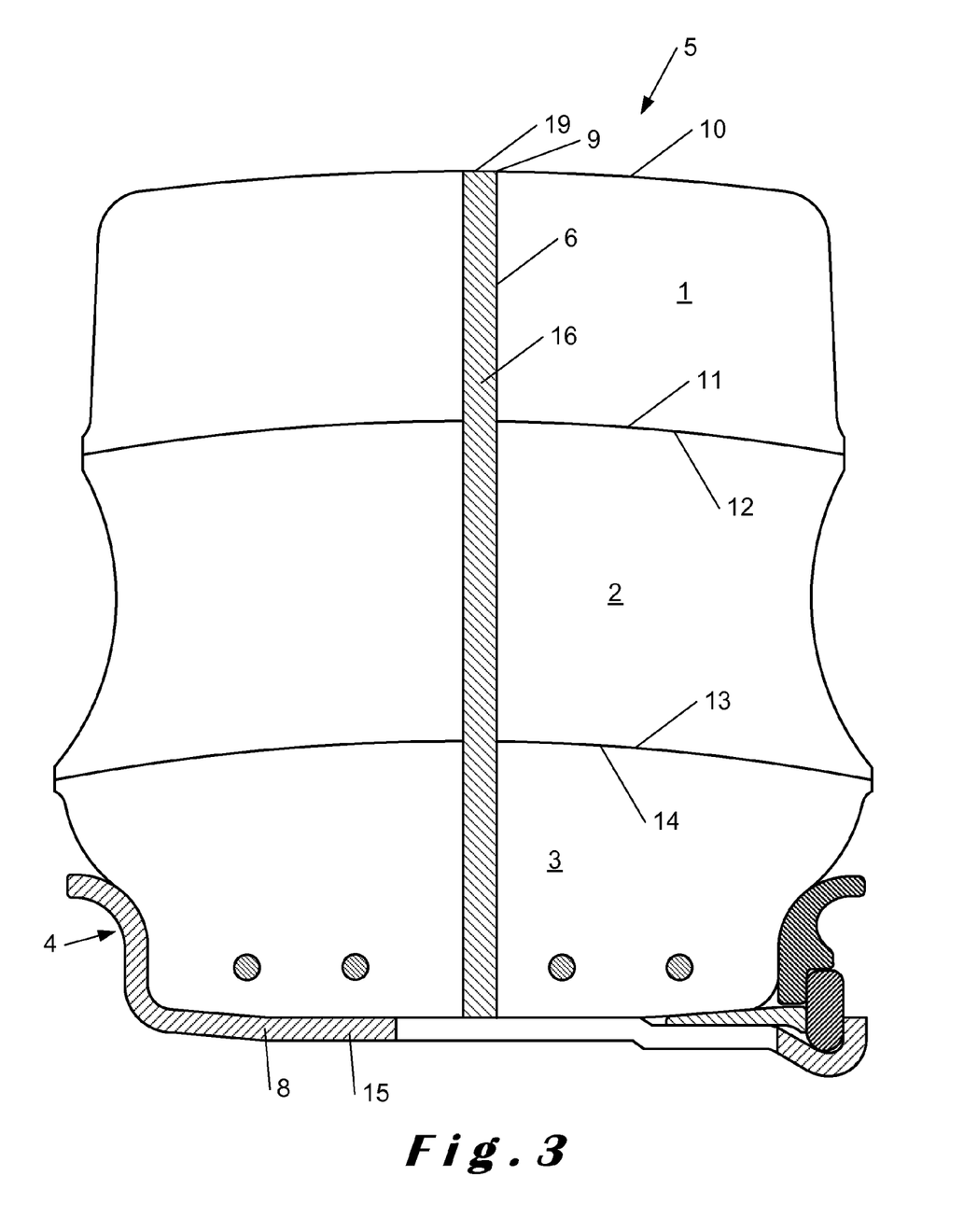
FIG. 3 shows a cross section of another embodiment of the tire according to FIG. 1.

The third layer 3 may for example comprise a metal plate which is then mounted to the rim 8 and thus to the electrically conductive parts 15 of the vehicle 4. The material of the third layer however does not need to be sufficiently electrically conductive. The path 6 can for example pierce completely through the third layer 3 to contact the rim 6 to discharge unwanted electrical charges from the electrical conductive means 15 to the ground as is shown in FIG. 3.

Figure 4:
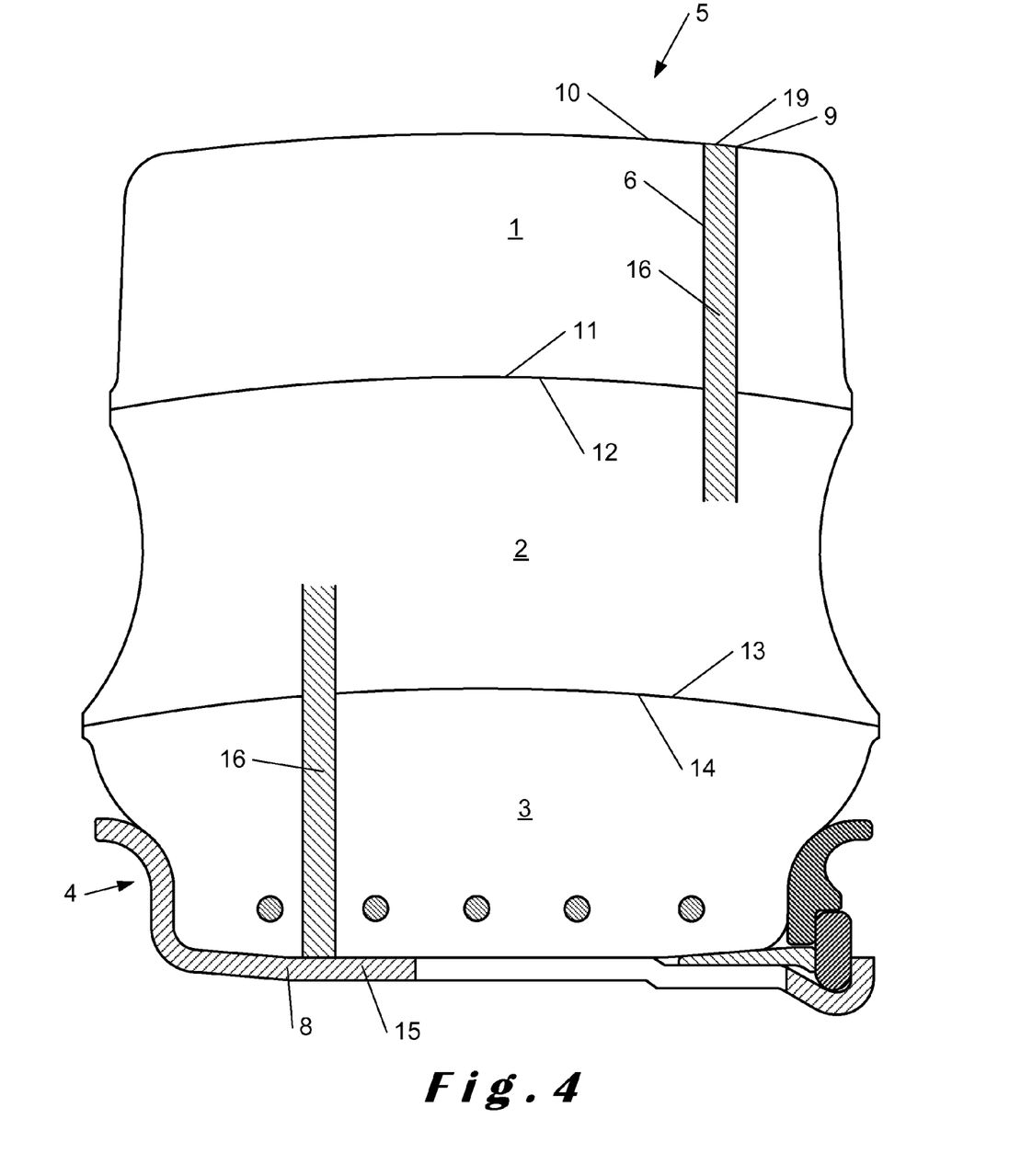
FIG. 4 shows a cross section of yet another embodiment of the tire according to FIG. 1.

A tire 5 comprising a sufficiently electrically conductive second layer 2 and an insufficient electrically conductive third layer is shown in FIG. 4. In this case the unwanted electric charge is discharged from the electrical conductive means 15, such as the rim 8, along the path 6 towards the material of the second layer 2 which conducts the charge to another path 6 in the first layer 1 conducting the charge to the ground.

The material used to produce the first, second and third layer may be the same or different. Additional layers can still be added beneath the third layer, this is however not critical for the invention and the shape of the additional layer can be determined by the person skilled in the art.

Although the path 6 may extend through all the layers provided beneath the first layer 1 for conducting the unwanted electrical charges from the electrically conducting means 15 up to the ground, the path 6 preferably only extends through the first layer 1 when the material of the underlying layers are sufficiently conductive to discharge the unwanted charges towards the ground. Limiting the length of the path 6 improves the homogeneity of the layered structure of the tire 5, thus improving homogeneous wearing of the tire 5 and improving the homogeneity of the mechanical properties of the tire 5. Decreasing the length of the path 6 also decreases the amount of material that needs to be removed from the layers, decreasing the time needed to make a tire 5 and decreasing loss of material caused by the removal.

The invention claimed is:

1. A solid tire for a wheel comprising electrically conductive means (15) comprising a first cylindrical layer (1) of a first material, comprising a first outer circumferential surface (10) provided for contacting the ground, the first layer (1) having an electrical resistance being larger than 1010 cm, the tire (5) comprising an electrically conducting path (6) in electrical connection with the electrical conducting means (15) and extending through the first layer (1), the electrical conducting path (6) comprising a path-filling material (16) having a lower electrical resistance than the first layer (1), characterised in that the first layer (1) comprises less than 2 pphr carbon black, in that the first layer (1) comprises at least 30 pphr reinforcing filling material and in that the electrically conducting path (6) has a ground contacting surface (19) having a surface of at least 150 mm$^2$.

2. A method for making a solid tire (5) for a vehicle wheel (4) comprising electrically conductive means (15) as in claim 1, the method comprising the steps of making an uncured tire (5) comprising a first layer (1) which extends in circumferential direction of the tire and is made of an uncured curable first material containing a reinforcing filling material, the first material having an electrical resistance above 1010 cm, removing part of the first layer (1) to create a path (6) which extends at least from a second inner circumferential surface (11) of the first layer (1) through the first layer (1) towards a first outer circumferential surface (10) of the first layer (1), filling the path (6) with an uncured curable path-filling material (16) having an electrical resistance which is smaller than 1010 cm, curing the uncured tire (5) so that the path-filling material (16) extends from the first inner circumferential surface (11) to the first outer circumferential surface (10) which is provided for contacting the ground and so that the path-filling material (16) is electrically connectable to the electrically conductive means (15) of the wheel (4) characterised in that, the filling of the path (6) with the uncured curable material (16) takes place under atmospheric pressure, in that the material of the first layer (1) comprises less than 2 pphr carbon black, at least 30 pphr of reinforcing filling material and in that the path-filling material (16) after curing has a ground contacting surface (19) area of at least 150 mm$^2$.

3. A method according to claim 2, characterised in that the material of the first layer (1) comprises less than 0.5 pphr carbon black.

4. A method according to claim 3, characterised in that the material of the first layer (1) comprises less than 0.2 pphr carbon black.

5. A method according to claim 2, characterised in that the material of the first layer (1) comprises less than 60 pphr reinforcing material.

6. A method according to claim 5, characterised in that the material of the first layer (1) comprises 50 pphr reinforcing material.

7. A method according to claim 2, characterised in that the path (6) extends linearly from the first inner circumferential surface (11) towards the first outer circumferential surface (10).

8. A method according to claim 7, characterised in that the path (6) extends radially from the first inner circumferential surface (11) towards the first outer circumferential surface (10).

9. A method according to claim 2, characterised in that the path (6) is cylindrically shaped.

10. A method according to claim 2, characterised in that the reinforcing filling material comprises a non-marking reinforcing filling material.

11. A method according to claim 10, characterised in that the reinforcing filling material comprises silica.

12. A method according to claim 11, characterised in that the non-marking reinforcing filling material comprises a white non-marking reinforcing filling material.

13. A method according to claim 2, characterised in that a second cylindrical layer (2) of a second material is provided which extends in circumferential direction of the tire (5) and which contains a second outer circumferential surface (12), in that along the second outer circumferential surface the first layer (1) of the first material is provided in such a way that the first inner circumferential surface (11) of the first layer runs along the second outer circumferential surface (12), the material of the second layer (2) having a smaller electrical resistance than the material of the first layer (1) and in that the path-filling material (16) extends at least up to the second outer surface (12).

14. A method according to claim 13, characterised in that the material of the second layer (1) comprises a curable material which is uncured when applied to the uncured tire (5).

15. A method according to claim 14, characterised in that the material of the second layer (2) comprises a cylindrical metal plate (7).

16. A method according to claim 14, characterised in that the second layer (2) comprises a second inner circumferential surface (13) on a side of the second layer (2) opposite the second outer circumferential surface (12), in that a third cylindrical layer (3) of a third material is applied beneath the second layer (2) in circumferential direction of the tire (5), the third layer (3) comprising a third outer circumferential surface (14) running along the second inner circumferential surface (13) and in that the third layer (3) is in electrical connection with the second layer (2) and the electrically conducting means of the wheel (4).

17. A method according to claim 16, characterised in that the path (6) extends from the third layer (3), through the first (1) and the second layer (2) up to the opening (9) in the first outer circumferential surface (10) so that the path-filling material (16) is electrically connected to the third layer (3) after curing.

* * * * *